United States Patent
Salmimaa et al.

(10) Patent No.: US 12,520,035 B2
(45) Date of Patent: Jan. 6, 2026

(54) DISPLAY-BASED IMAGE CAPTURE CONTROL SYSTEM AND METHOD

(71) Applicant: Nokia Technologies Oy, Espoo (FI)

(72) Inventors: Marja Pauliina Salmimaa, Tampere (FI); Toni Johan Järvenpää, Tampere (FI); Arto Juhani Lehtiniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 137 days.

(21) Appl. No.: 18/494,836

(22) Filed: Oct. 26, 2023

(65) Prior Publication Data

US 2024/0179400 A1   May 30, 2024

(30) Foreign Application Priority Data

Nov. 24, 2022   (EP) .................................. 22209380

(51) Int. Cl.
*H04N 23/63*   (2023.01)
*G06F 21/62*   (2013.01)
(Continued)

(52) U.S. Cl.
CPC ....... *H04N 23/632* (2023.01); *G06F 21/6245* (2013.01); *H04N 23/53* (2023.01); *H04N 23/611* (2023.01); *H04N 23/62* (2023.01); *H04N 23/80* (2023.01); *H04N 23/90* (2023.01); *G06V 40/168* (2022.01); *G06V 40/172* (2022.01)

(58) Field of Classification Search
CPC .... H04N 23/632; H04N 23/53; H04N 23/611; H04N 23/62; H04N 23/80; H04N 23/90; H04N 23/20; H04N 23/57; H04N 23/63; G06F 21/6245; G06F 21/629;
(Continued)

(56) References Cited

U.S. PATENT DOCUMENTS 5,159,445 A * 10/1992 Gitlin ................. H04N 7/144
                                                    348/E7.08
6,005,604 A * 12/1999 Kakii ................. H04N 7/142
                                                    348/E7.079
(Continued)

FOREIGN PATENT DOCUMENTS

EP   2695033 A1   2/2014
EP   4016182 A1   6/2022
(Continued)

OTHER PUBLICATIONS

Office action received for corresponding European Patent Application No. 22209380.9, dated Apr. 1, 2025, 5 pages.
(Continued)

*Primary Examiner* — Usman A Khan
(74) *Attorney, Agent, or Firm* — Nokia Technologies Oy

(57) ABSTRACT

Example embodiments relate to an apparatus, method and computer program associated with modification of captured images. The method may comprise capturing images using an under-display camera of an apparatus in which at least some display pixels which overlie a camera sensor are disabled. The method may also detecting at least one predetermined condition and enabling at least some of the disabled display pixels to modify at least part of an image or images being captured, responsive to detecting the at least one predetermined condition.

19 Claims, 9 Drawing Sheets

(51) Int. Cl.
*G06V 40/16* (2022.01)
*H04N 23/53* (2023.01)
*H04N 23/611* (2023.01)
*H04N 23/62* (2023.01)
*H04N 23/80* (2023.01)
*H04N 23/90* (2023.01)

(58) Field of Classification Search
CPC .... G06F 21/83; G06V 40/168; G06V 40/172; H04M 1/72427; H04M 1/724631
USPC .......................................................... 348/239
See application file for complete search history.

(56) References Cited

U.S. PATENT DOCUMENTS

| | | | | |
|---|---|---|---|---|
| 6,888,562 | B2* | 5/2005 | Rambo | H04N 7/144 348/348 |
| 7,714,923 | B2* | 5/2010 | Cok | H04N 7/144 348/340 |
| 7,916,167 | B2* | 3/2011 | Miyagawa | H04N 7/144 348/373 |
| 8,390,671 | B2* | 3/2013 | Kanade | G09G 3/3611 348/14.08 |
| 9,204,089 | B2* | 12/2015 | Nagano | H04N 7/144 |
| 10,939,054 | B2* | 3/2021 | Liu | G02F 1/133528 |
| 2007/0002130 | A1* | 1/2007 | Hartkop | H04N 13/144 348/E7.078 |
| 2009/0009628 | A1* | 1/2009 | Janicek | H04N 7/144 348/333.01 |
| 2009/0102763 | A1* | 4/2009 | Border | H04N 7/144 345/87 |
| 2011/0279689 | A1* | 11/2011 | Maglaque | H04N 23/54 348/333.01 |
| 2012/0258773 | A1* | 10/2012 | Alvarez Rivera | G06F 1/1656 726/19 |
| 2013/0182062 | A1* | 7/2013 | Son | H04N 7/144 348/14.07 |
| 2013/0247175 | A1* | 9/2013 | Nechyba | G06F 21/32 726/19 |
| 2014/0063049 | A1 | 3/2014 | Armstrong-Muntner | |
| 2017/0124942 | A1* | 5/2017 | Evans, V | G02B 27/0093 |
| 2017/0251137 | A1* | 8/2017 | Evans, V | H04N 23/51 |
| 2018/0198980 | A1* | 7/2018 | Takagi | G06V 40/19 |
| 2019/0243427 | A1* | 8/2019 | Nakamura | G06F 1/1626 |
| 2022/0272246 | A1* | 8/2022 | Verma | H04N 23/72 |
| 2022/0343471 | A1* | 10/2022 | Nakata | G06F 1/1626 |
| 2024/0126857 | A1* | 4/2024 | Jin | G06F 3/0412 |

FOREIGN PATENT DOCUMENTS

| | | |
|---|---|---|
| WO | 2012/138579 A1 | 10/2012 |
| WO | 2021/023361 A1 | 2/2021 |
| WO | 2021/092887 A1 | 5/2021 |

OTHER PUBLICATIONS

"Samsung Galaxy Z Fold 4 vs Galaxy Z Fold 3: What's changed?", The Indian Express, Retrieved on Nov. 3, 2023, Webpage available at : https://indianexpress.com/article/technology/mobile-tabs/samsung-galaxy-z-fold-4-vs-galaxy-z-fold-3-compare-features-specifications-8083793/.
"The IPhone 14 Pro and 14 Pro Max's Dynamic Island could fix the Apple's notch", The Verge, Retrieved on Nov. 3, 2023, Webpage available at : https://www.theverge.com/23341555/apple-iphone-14-pro-max-notch-dynamic-island-fix.
"Smartphones could have selfie cameras hidden under the display", Daily Mail Online, Retrieved on Nov. 3, 2023, Webpage available at : https://www.dailymail.co.uk/sciencetech/article-7098835/Smartphones-selfie-cameras-hidden-display.html.
"iPhone X: The hardware behind Face ID", ZDNET, Retrieved on Nov. 3, 2023, Webpage available at : https://www.zdnet.com/article/iphone-x-the-hardware-behind-face-id/.
"Philips takes on cinema piracy with new ambient light technology", ZDNET, Retrieved on Nov. 3, 2023, Webpage available at : https://www.zdnet.com/article/philips-takes-on-cam-piracy-with-new-ambient-light-technology/.
Wang et al., "Self-Assembled Cathode Patterning in AMOLED for Under-Display Camera", Society for Information Display, 2020, pp. 811-814.
Extended European Search Report received for corresponding European Patent Application No. 22209380.9, dated May 7, 11, 2023, 6 pages.

* cited by examiner

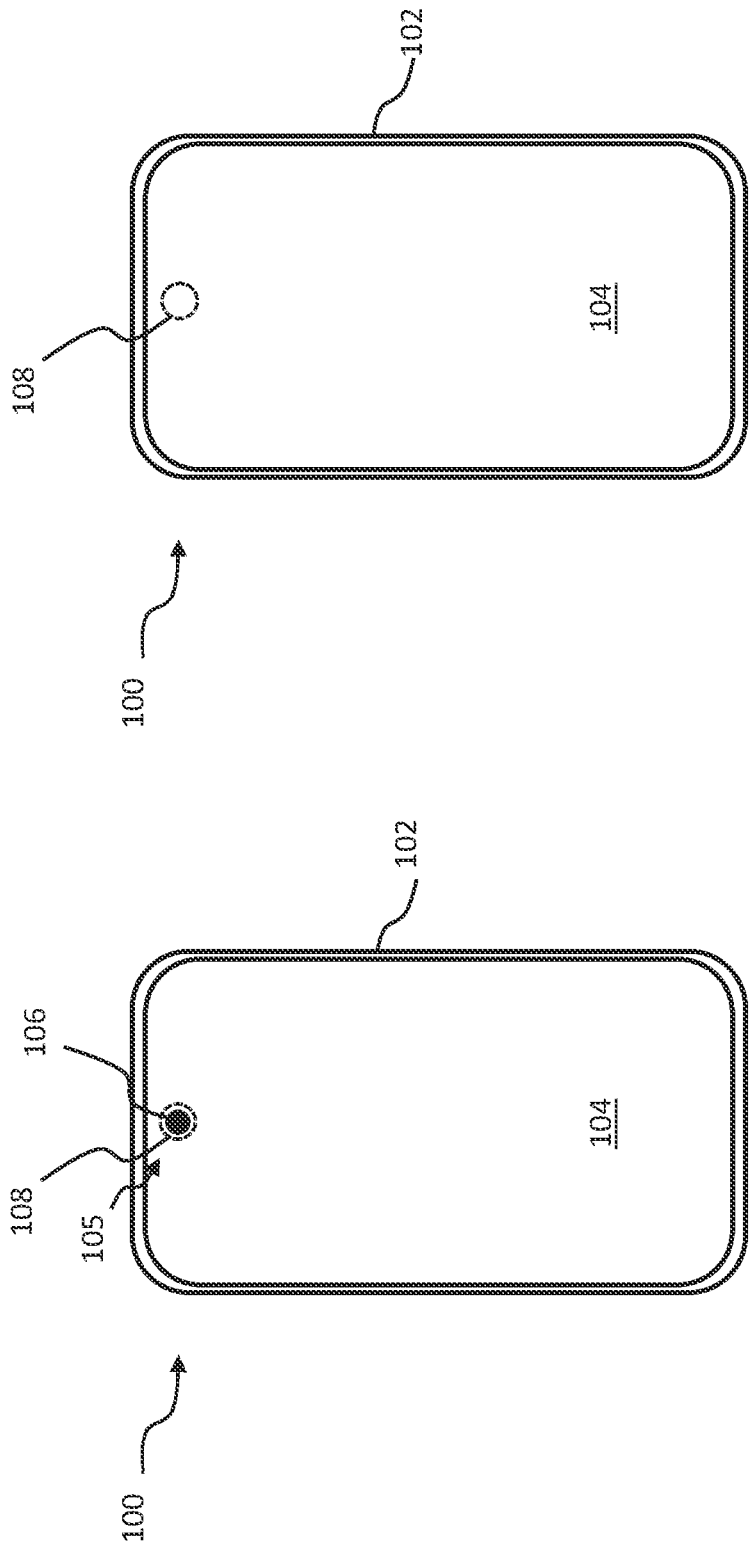

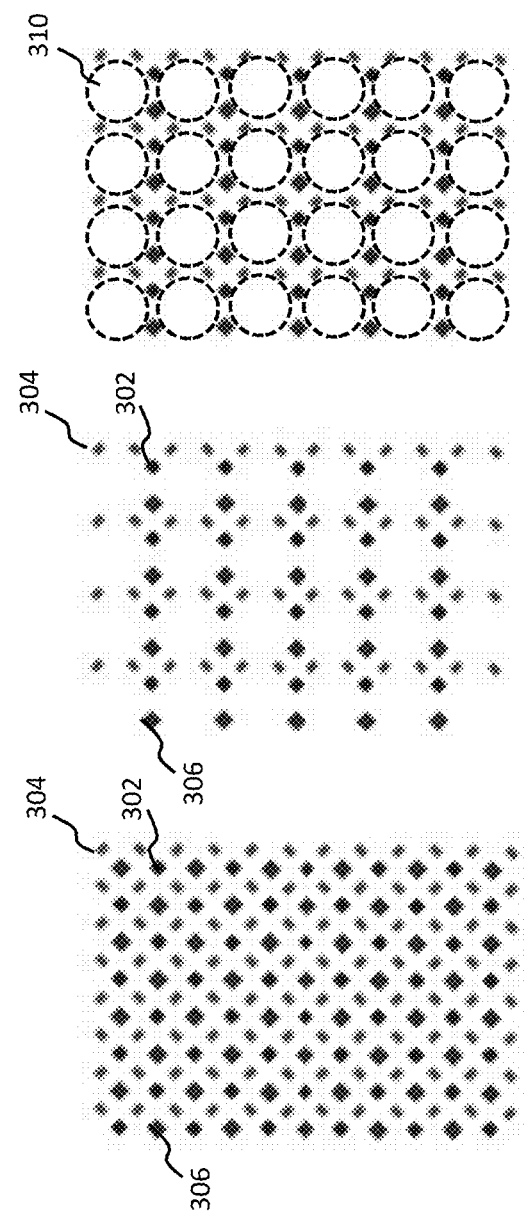

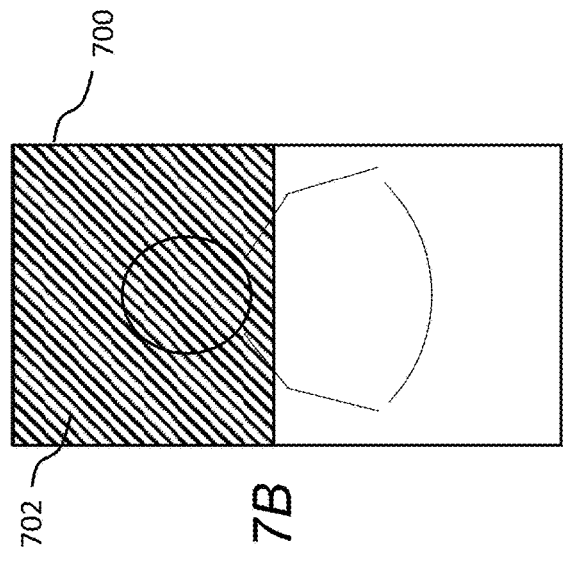
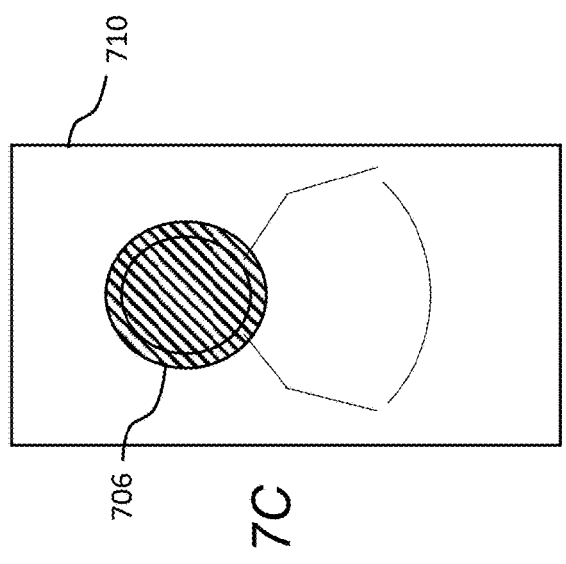
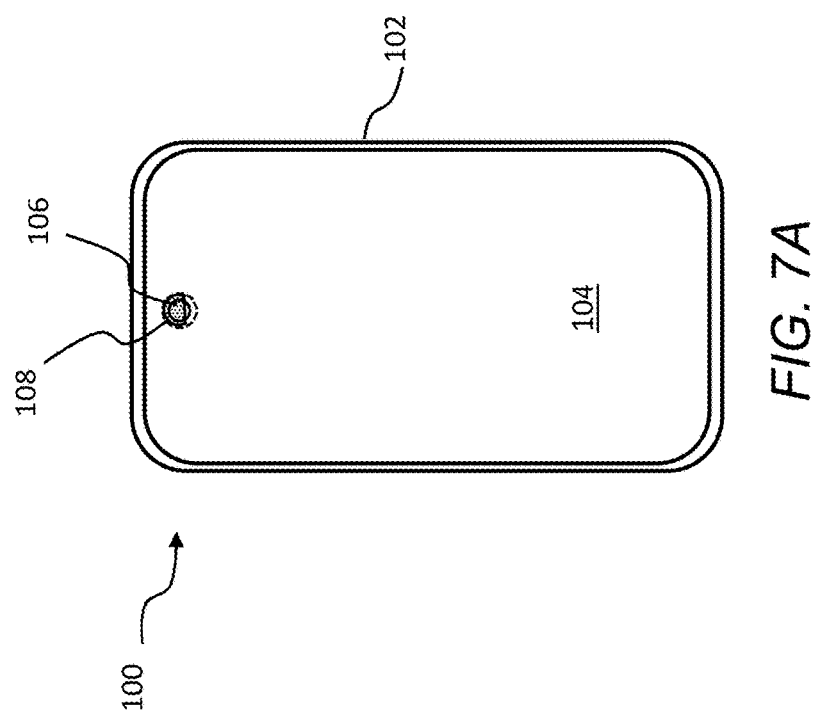

DISPLAY-BASED IMAGE CAPTURE CONTROL SYSTEM AND METHOD

TECHNICAL FIELD

Example embodiments relate to an apparatus, method and computer program associated with modification of captured images.

BACKGROUND

A user device may comprise a camera for capture of still and/or moving images. The user device may comprise a screen on one side thereof. Also provided on the screen side may be a camera, sometimes referred to as a front-facing or "selfie" camera. The front-facing camera may be used by a user of the user device to capture their own image and may be enabled in certain situations, for example when the user selects to use said camera in a camera application and/or when the user selects to initiate or answer a video call or join a video conference.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising: means for capturing images using an under-display camera in which at least some display pixels which overlie a camera sensor are disabled, the under-display camera being located under a display of the apparatus; means for detecting at least one predetermined condition; and means for enabling at least some of the disabled display pixels to modify at least part of an image or images being captured, responsive to detecting the at least one predetermined condition.

The enabling means may be configured to enable substantially all of the disabled display pixels to modify substantially all of the image or images being captured.

The enabling means may be configured to enable only a sub-portion of the disabled display pixels to modify only a sub-portion of the image or images being captured.

The enabling means may be configured to enable at least some of the disabled display pixels so as to perform one or more of: blurring at least part of the image or images being captured; blending at least part of the image or images being captured with another image; and/or modifying the contrast of at least part of the image or images being captured.

At least some of the disabled display pixels may comprise infra-red or near-infra-red display pixels and wherein the enabling means may be configured to reduce the contrast of at least part of the image or images being captured by enabling the infra-red or near-infra-red display pixels.

The apparatus may further comprise means for displaying an icon or graphic on the display of the apparatus indicative of detection of the at least one predetermined condition.

The icon or graphic may be animated.

The enabling means may be configured to display the icon or graphic by enabling at least some of the disabled display pixels to simultaneously display the icon or graphic on the display and modify at least part of the image or images being captured.

The at least one predetermined condition may comprise detection of a user privacy preference associated with the apparatus or a user of the apparatus.

The at least one predetermined condition may comprise detection of facial features in the image or images being captured. The detected facial features may be determined to match reference facial features associated with a particular person.

The apparatus may further comprise means for performing facial recognition locally at the apparatus using the detected facial features and the reference facial features.

The user privacy preference may be associated with the particular person, and is indicative that images comprising facial features associated with the particular person are to be modified.

The enabling means may be configured to enable a sub-portion of the disabled display pixels to modify at least a sub-portion of the image or images being captured which correspond to the detected facial features.

The apparatus may further comprise means for determining a location of the apparatus, and wherein the at least one predetermined condition may comprise identifying that said location corresponds to a predetermined location in which an image or images being captured are to be modified.

The at least one predetermined condition may comprise detection of a data connection by the apparatus to a predetermined remote system, platform or website or type thereof. The data connection may be for streaming live images to a remote system, platform or website.

The at least one predetermined condition may comprise detecting an image modification user-input during capture of the image or images. The image modification user-input may comprise user selection of a graphical element shown on the display of the apparatus. The graphical element may comprise a viewfinder window showing what is being captured by the under-display camera and wherein the image modification user-input comprises user placement of the viewfinder window to a position corresponding to the under-display camera.

The under-display camera may be on a front side of the apparatus and the apparatus may further comprise a further camera on a rear side thereof and means for disabling the further camera upon detection of the at least one predetermined condition.

According to a second aspect, this specification describes a method, comprising: capturing images using an under-display camera of an apparatus in which at least some display pixels which overlie a camera sensor are disabled; detecting at least one predetermined condition; and enabling at least some of the disabled display pixels to modify at least part of an image or images being captured, responsive to detecting the at least one predetermined condition.

The enabling may comprise enabling substantially all of the disabled display pixels to modify substantially all of the image or images being captured.

The enabling may comprise enabling only a sub-portion of the disabled display pixels to modify only a sub-portion of the image or images being captured.

The enabling may comprise enabling at least some of the disabled display pixels so as to perform one or more of: blurring at least part of the image or images being captured; blending at least part of the image or images being captured with another image; and/or modifying the contrast of at least part of the image or images being captured.

At least some of the disabled display pixels may comprise infra-red or near-infra-red display pixels and wherein the enabling may comprise reducing the contrast of at least part of the image or images being captured by enabling the infra-red or near-infra-red display pixels.

The method may further comprise displaying an icon or graphic indicative of detection of the at least one predetermined condition. The icon or graphic may be animated. The icon or graphic may be displayed by enabling at least some of the disabled display pixels to simultaneously display the icon or graphic on the display and modify at least part of the image or images being captured.

The at least one predetermined condition may comprise detection of a user privacy preference associated with the apparatus or a user of the apparatus.

The at least one predetermined condition may comprise detection of facial features in the image or images being captured. The detected facial features may be determined to match reference facial features associated with a particular person.

The method may further comprise performing facial recognition locally at the apparatus using the detected facial features and the reference facial features.

The user privacy preference may be associated with the particular person, and is indicative that images comprising facial features associated with the particular person are to be modified.

The enabling may comprise enabling a sub-portion of the disabled display pixels to modify at least a sub-portion of the image or images being captured which correspond to the detected facial features.

The method may further comprise determining a location of the apparatus, and wherein the at least one predetermined condition may comprise identifying that said location corresponds to a predetermined location in which an image or images being captured are to be modified.

The at least one predetermined condition may comprise detection of a data connection by the apparatus to a predetermined remote system, platform or website or type thereof. The data connection may be for streaming live images to a remote system, platform or website.

The at least one predetermined condition may comprise detecting an image modification user-input during capture of the image or images. The image modification user-input may comprise user selection of a graphical element shown on the display of the apparatus. The graphical element may comprise a viewfinder window showing what is being captured by the under-display camera and wherein the image modification user-input comprises user placement of the viewfinder window to a position corresponding to the under-display camera.

The method may further comprise disabling a further camera on a rear-side of the apparatus upon detection of the at least one predetermined condition.

According to a third aspect, this specification describes a computer program comprising instructions for causing an apparatus to perform at least the following: capturing images using an under-display camera of an apparatus in which at least some display pixels which overlie a camera sensor are disabled; detecting at least one predetermined condition; and enabling at least some of the disabled display pixels to modify at least part of an image or images being captured, responsive to detecting the at least one predetermined condition.

The third aspect may also comprise any feature of the second aspect.

According to a fourth aspect, this specification describes a computer-readable medium (such as a non-transitory computer-readable medium) comprising program instructions stored thereon for performing at least the following: capturing images using an under-display camera of an apparatus in which at least some display pixels which overlie a camera sensor are disabled; detecting at least one predetermined condition; and enabling at least some of the disabled display pixels to modify at least part of an image or images being captured, responsive to detecting the at least one predetermined condition.

The fourth aspect may also comprise any feature of the second aspect.

According to a fifth aspect, this specification describes an apparatus comprising: at least one processor; and at least one memory including computer program code which, when executed by the at least one processor, causes the apparatus to: capture images using an under-display camera of an apparatus in which at least some display pixels which overlie a camera sensor are disabled; detect at least one predetermined condition; and enable at least some of the disabled display pixels to modify at least part of an image or images being captured, responsive to detecting the at least one predetermined condition.

The fifth aspect may also comprise any feature of the second aspect.

BRIEF DESCRIPTION OF DRAWINGS

Example embodiments will now be described, by way of non-limiting example, with reference to the accompanying drawings, in which:

FIG. 1 is a front plan view of a user device having an under-display camera which is visible;

FIG. 2 shows the FIG. 1 user device in which the under-display camera is hidden;

FIGS. 3A-3C are partial views of a display pixel matrix of the FIG. 1 user device display;

FIG. 7A is a front plan view of the FIG. 1 user device where only some of the display pixels above the under-display camera are enabled, according to one or more example embodiments;

FIG. 7B shows an image captured by the FIG. 7A user device;

FIG. 7C shows an alternate image captured when only some of the display pixels above the under-display camera are enabled, according to one or more example embodiments;

DETAILED DESCRIPTION

Figure 4:
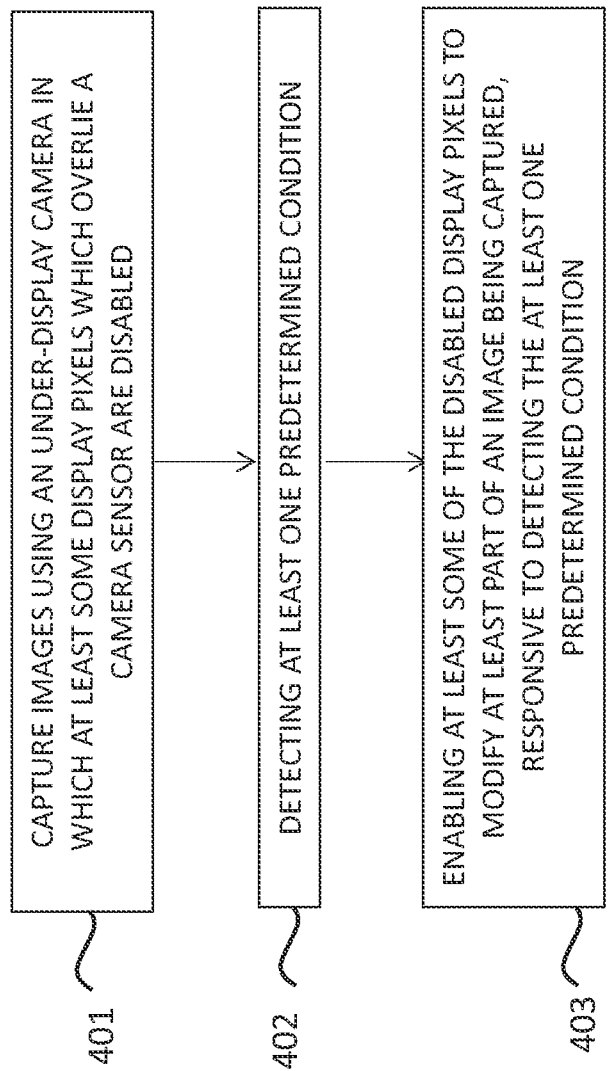
FIG. 4 is a flow diagram showing operations that may be performed by the FIG. 1 user device, according to one or more example embodiments.

Example embodiments may relate to an apparatus, method and computer program associated with modification of one or more captured images.

As used herein, the apparatus may be a user device comprising at least one camera.

Examples of a user device include, but are not limited to, a smartphone, a digital assistant, a digital music player, a personal computer, a laptop, a tablet computer or a wearable device such as a smartwatch.

A user device may, but is not necessarily, capable of establishing a communications session with one or more other user devices, servers or nodes via a communications network. A user device may be configured to transmit and receive data using protocols for 3G, 4G, LTE, 5G or any future generation communication protocol. A user device may comprise means for short-range communications using, for example, Bluetooth, Zigbee or WiFi. The user device may comprise one or more antennas for communicating with external devices, for example one or more other remote user devices and/or one or more remote servers and/or one or more communications nodes of a network.

As already noted, a user device may comprise a camera for capture of still or moving images. The user device may comprise a display screen on a front side thereof, which may be a touch-sensitive display. The display screen may comprise a number of layers, including an outer-most protective layer and, underneath, a layer of light emitters representing pixels. Also visible from the front side may be a front-facing camera, sometimes referred to as a "selfie" camera which may be used by a user of the user device to capture their own image. The front-facing camera may be enabled in certain situations, for example when the user selects to use said camera in a camera application and/or when the user selects to initiate or answer a video call or join a video conference.

There may be circumstances where it is desirable to modify content being captured by one or more cameras of a user device.

For example, a user may prefer to conceal, obfuscate and/or reduce the amount of detail visible in captured images.

For example, the user may prefer other parties to a video call, video conference or streaming session not to see the environment around the user. The environment may comprise sensitive information, e.g. confidential information on another computer screen or photographs of family members. The environment may be a workplace or other sensitive location. For example, the user may prefer their facial features to be modified for privacy purposes.

Nevertheless, in some cases, it may be that the user wishes some information about their facial features and/or environment to remain.

Referring to FIG. 1, an example user device is shown in the form of a smartphone 100.

The smartphone 100 may comprise an outer peripheral casing 102 and, on a front side, a touch-sensitive display (hereafter "display") 104 and a front-facing camera 105. The smartphone 100 may also comprise one or more speakers and one or more microphones which are not shown in the figure. The smartphone 100 may additionally comprise a rear-facing camera (not shown) on a rear side of the smartphone. The front-facing camera 105 may be enabled during, for example, use of a camera application for still or video capture, a video conference or social media application whereby video data captured by the front-facing camera may be transmitted over an established channel, and/or when the user is involved in a video call.

The front-facing camera 105 may comprise an under-display camera. The term under-display camera 105 will be used hereafter.

The under-display camera 105 may comprise a camera sensor 106 which is located under the display 104, that is under an outer layer of glass (or similar) and a layer of light emitters (hereafter "emitters") which may represent pixels or sub-pixels. The emitters may be arranged in a grid-like fashion according to any suitable format.

For example, the emitters may comprise a grid of red, green and blue (RGB) emitters arranged according to a certain pattern. One such pattern is called a PenTile matrix. Each emitter may represent a pixel or sub-pixel. Where each emitter represents a sub-pixel, different respective levels applied to a grouping of the RGB emitters may represent a pixel of a particular colour and brightness.

One or more other emitters, for example infra-red or near-infra-red emitters, may also be distributed among RGB emitters according to a certain pattern; although such emitters do not produce visible light, they may have other purposes, as will be explained below.

For avoidance of doubt, references hereafter to "display pixel" or "display pixels" may be used in place of "emitter" or "emitters" and may refer to one emitter or a group of spatially adjacent emitters for producing part of an image.

The display 104 may comprise two sets of display pixels controlled using first and second display drivers respectively. In other embodiments, a single display driver may be used for handling the two sets of display pixels separately.

A first set of display pixels 108 may overlie the camera sensor 106 and are driven by the first display driver. A second set of display pixels may occupy the remainder of the display 104 and are driven by the second display driver.

In FIG. 1, the first set of display pixels 108 occupy a circular region which overlies the camera sensor 106 but alternative-shaped regions may be used, e.g. rectangular. The first set of display pixels 108 may extend slightly extend beyond the region that directly overlies the camera sensor 106, for example by one or a few millimetres.

In operation, each of the first set of display pixels 108 may be selectively enabled and disabled according to operations of the first display driver, as will be described below.

For example, in a first mode, at least some display pixels of the first set of pixels 108 may be disabled. If a large number of display pixels and/or a certain pattern of said display pixels in sufficient number are disabled, the region overlying the camera sensor 106 becomes substantially transparent to the camera sensor. The camera sensor 106 from the point of view of the user is visible as a notch or island. The first display driver may initiate the first mode upon use of a camera application, a video conference or social media application and/or when the user is engaged in a video call. This situation is shown in FIG. 1.

For example, in a second mode, all or substantially all display pixels 108 of the first set of emitters which were disabled in the first mode may be enabled and the region overlying the camera sensor 106 is no longer substantially transparent. The camera sensor 106 is substantially hidden from view from the point of view of the user. The first display driver may initiate the second mode as a default, e.g. when not using a camera application, video conference or social media application and/or when the user is not engaged in a video call. In the second mode, the first set of display pixels 108 and the second set of display pixels may display respective parts of a single image or graphical user interface (GUI). The notch or island becomes substantially invisible. This situation is shown in FIG. 2.

For the avoidance of doubt, enabled display pixels of the first set of pixels 108 may appear black. Enabling such display pixels reduces or removes transparency caused by disabled pixels and does not necessarily involve light emission.

For completeness, FIG. 3A shows a diamond PenTile pixel matrix comprising red, green and blue display pixels 302, 304, 306 which may be distinguished by their respective sizes and shapes. FIG. 3A may correspond to the second mode of operation mentioned above. FIG. 3B shows the same pixel matrix whereby a predetermined set of the red, green and blue display pixels 302, 304, 306 are disabled. This corresponds to the first mode of operation mentioned above. FIG. 3C is the same as FIG. 3B but indicates a grid of generally circular transparent regions 310. The sparseness of the remaining red, green and blue display pixels 302, 304, 306 means they are hardly noticeable and the camera sensor 106 can capture images.

Example embodiments may relate to a third mode of operation in which, during capture of one or more images using the under-display camera 105, at least some of the display pixels disabled in the first mode are enabled responsive to detecting at least one predetermined condition. This may modify the image or images being captured because the enabled pixels are captured by the camera sensor 106.

FIG. 4 is a flow diagram indicating processing operations that may be performed by, for example, the smartphone 100, or rather a processing means of the smartphone, according to one or more example embodiments. The processing operations may be performed by any apparatus comprising a camera, particularly an under-display camera. The processing operations may be performed by means of hardware, software, firmware or a combination thereof.

A first operation 401 may comprise capturing images using an under-display camera in which at least some display pixels which overlie a camera sensor are disabled.

This may correspond to the first mode of operation described above.

A second operation 402 may comprise detecting, i.e. during the capturing, at least one predetermined condition. Example predetermined conditions will be described below.

A third operation 403 may comprise enabling at least some of the disabled display pixels to modify at least part of an image or images being captured, responsive to detecting the at least one predetermined condition. This may be distinguished from the second mode of operation because images are being captured and modified by the enabling of the disabled display pixels.

Regarding the second operation 402, an example predetermined condition may involve detection of a user privacy preference associated with the user device, e.g. the smartphone 100. That is, the user may be given the option of enabling the user privacy preference by means of some feature or setting of the operating system or some application running on the user device.

Alternatively, or additionally, one or more other predetermined conditions may be required in order to cause modification of captured images.

To give some examples, the predetermined condition may be met if facial features are detected in one or more images being captured by the user device. The facial features may or may not be associated with a particular person. It may be that the facial features need to match facial features associated with a particular person, e.g. the user of the user device, using reference facial features, which may be a predetermined set of facial features (or data representative thereof) which may be stored locally at the user device or which may be stored remotely and can be accessed by the user device. An image recognition algorithm may be performed by the user device during image capture for this purpose.

Alternatively, an image recognition algorithm may be performed by a remote node instead of by the user device; this may be appropriate if, for example, the user device is connected to a remote node as part of a video call or videoconference in which captured images are being streamed in real-time. There may be a predetermined condition that images comprising facial features associated with a particular person (but not necessarily other persons which are part of the call or conference) are to be modified, and if that particular person is identified in captured images, the remote node may transmit an indication to the relevant capturing user device which may then modify the captured images in accordance with examples described herein. For example, the particular person may identify themselves to the remote node by a username (possibly verified by a password) and then the remote node may retrieve or access reference facial features for the particular person which are used by the image recognition algorithm.

In some example embodiments, the predetermined condition may relate to a location of the user device. In this respect, certain locations may be considered restricted locations whereby image modifications are to be applied in accordance with examples described herein. Such locations may include workplaces, government buildings and so on.

For example, the location of the user device may be determined using a Global Navigation Satellite System (GNSS) receiver or the like provided on the user device. Other methods of localising the user device, e.g. using WiFi access points, may be used. Additionally, or alternatively, one or more objects, e.g. landmarks, detectable in the captured images may be indicative of the location of the user device. If the location of the user device corresponds with a restricted location, which may be defined in a set or list of restricted locations stored locally on the user device or accessible to the user device, captured images may be modified, at least for the duration that the user device is in the restricted location.

Additionally, or alternatively, a restricted location may comprise one or more transmitters which may act as beacons for transmitting signals to user devices within their vicinity for causing modification of captured images in accordance with examples described herein.

In some example embodiments, the predetermined condition may relate to a data connection between the user device and a predetermined remote system, platform or website or type thereof. For example, there may be list of certain remote systems, platforms, websites or types thereof for which image modifications may need to be applied. For example, connections to particular social media platforms may meet the predetermined condition. It may be that the predetermined condition is met if the connection involves streaming live images to the said remote system, platform or website or types thereof, but not necessarily other actions.

In some example embodiments, the predetermined condition may involve detection of a specific user input, i.e. an image modification user input, which may be made through the display screen or through some other mechanism, e.g. using a gesture or voice command.

Different combinations of predetermined conditions may be required in order to cause modification of captured images. These may be user defined.

Figure 5:
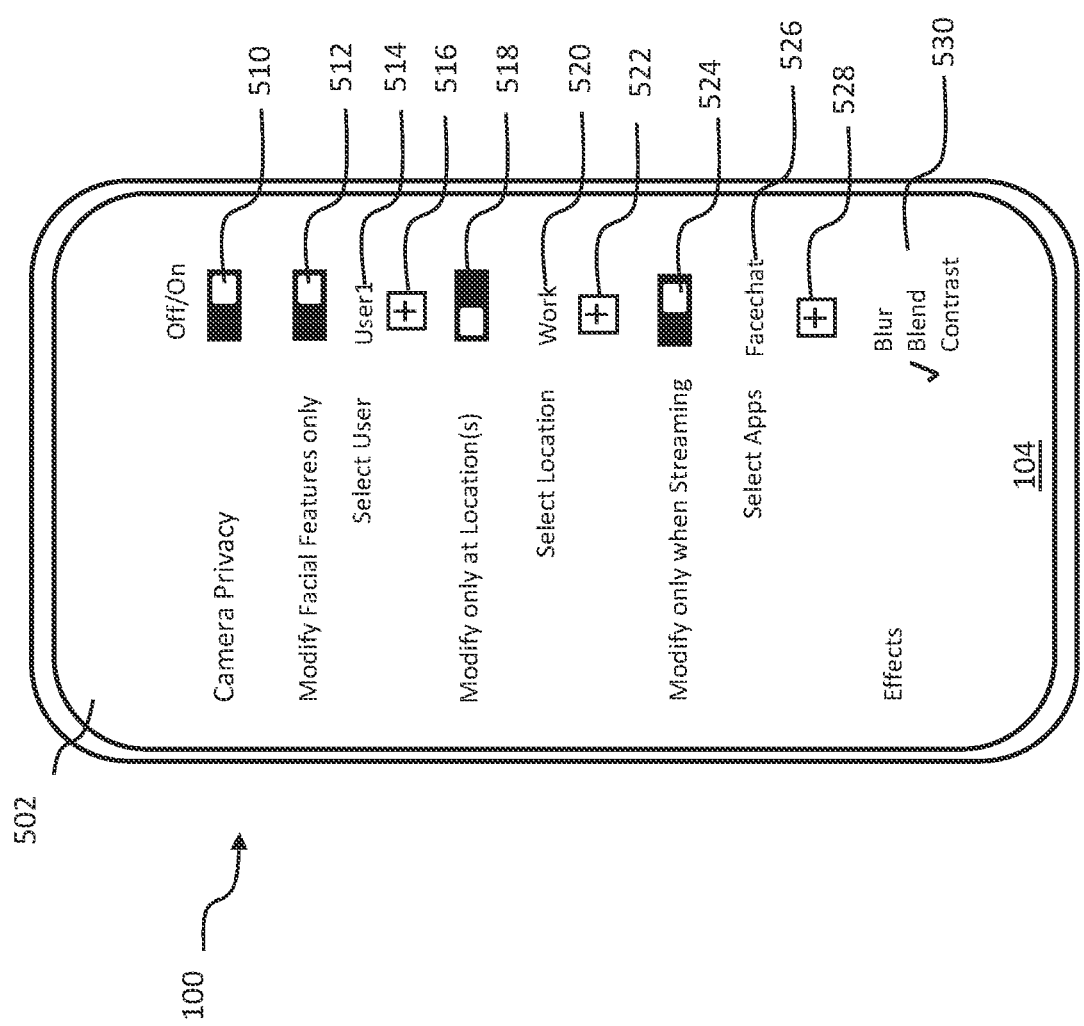
FIG. 5 is a front plan view of the FIG. 1 user device showing an application user interface, according to one or more example embodiments.

FIG. 5 shows the FIG. 1 smartphone 100 displaying a user interface (UI) 502 on the display 104 which may be used to implement one or more of the above predetermined conditions. The UI 502 provides a number of user-selectable UI functions, which may be functions associated with a so-called privacy mode application which may perform the one or more operations described above with reference to FIG. 4. Here, it is assumed that privacy is the main purpose of modifying captured images, but there may be alternative or additional purposes.

A first UI function, which may be enabled and disabled by means of graphical element 510, is a camera privacy mode. The camera privacy mode may be a global option that either results in all captured images being modified when enabled, or which reveals sub-options which are further conditions that need to be met in order for captured images to be modified when enabled.

A second UI function, which may be enabled and disabled by means of graphical element 512, relates to modifying facial features only. In other words, enablement of the second UI option means that only captured images comprising facial features will be modified and, in this case, that only a sub-portion of display pixels representing the facial features will be modified. Beneath the graphical element 512 may be displayed an indicator 514 of one or more persons of whom facial features are to be modified; without selection of a person, all images comprising facial features may be modified. Alternatively, a default may be the user of the smartphone 100 but this can be removed and/or one or more other persons may be added. Beneath the indicator 514 may be displayed an "add" button 516 for adding (or removing) people to the list from a menu, resulting in the indicator 514 being updated as appropriate.

A third UI function, which may be enabled and disabled by means of graphical element 518, relates to modifying captured images only at certain locations. If enabled, this may mean that captured images are only modified if the smartphone is in a location corresponding to one set by this third UI function. Beneath the graphical element 518 is an indicator 520 of one or more locations. Here, the word "work" is shown which may correspond to the user's workplace as already defined during use of the privacy mode application. Beneath the indicator 520 may be displayed an "add" button 522 for adding (or removing) and/or defining locations from a menu, resulting in the indicator 520 being updated as appropriate. For example, when defining a location, the user may employ various methods. For example, the user may use a settings menu of the privacy mode application to define a current location (e.g. their workplace) as one of the locations, at which time the privacy mode application may save co-ordinates of the location and prompt the user to enter a label for the location, in this case "work." The privacy mode application may then create a region or zone that is larger than the saved co-ordinates, and it is this region or zone which comprises the defined location. For example, by default, a circular region of diameter fifty metres may be defined with the saved co-ordinates at the centre of the circular region. Alternatively, or additionally, the user may define a location via entering specific co-ordinates, drawing a region on a map UI, and/or entering a ZIP or postal code.

A plurality of different locations may be defined with respective labels from which a user may select any number using the add button 522.

A fourth UI function, which may be enabled and disabled by means of graphical element 524, relates to modifying captured images only when streaming, i.e. streaming video content. Beneath the graphical element 524 is an indicator 526 of one or more applications to which this UI function relates to. If nothing is selected, any streaming connection will result in modifying captured images. If one or more applications are selected, only streaming connections to these one or more applications will cause captured images to be modified. Beneath the indicator 526 may be displayed an "add" button 528 for adding (or removing) applications from a menu, resulting in the indicator 526 being updated as appropriate.

As will be seen from the shown UI 502, in this example the first, second and fourth UI functions are enabled, with certain settings. This means that captured images will be modified but only in respect of images comprising facial features of "User1" when streaming to the application "Facechat".

A fifth UI function, which may be enabled and disabled by means of graphical element 530, enables selection of one or more image modification options, including "blur", "blend" and "contrast". Each offers a different way of modifying captured image by means of enabling certain display pixels according to a certain pattern and/or intensity. A user may select one or more such image modification options. The "blur" option may involve enabling disabled pixels with a certain noise-like distribution to create a blurring effect across at least part of the captured images. The "blend" option may involve enabling disabled pixels so as to blend captured images with another image, for example an image selected from a gallery or one which is a continuation of the current UI, e.g. the desktop or operating system UI of the smartphone 100. The "contrast" option may refer to a low-contrast setting which may enable one or more disabled infra-red or near-infra-red pixels to reduce contrast of captured images, making at least part of the captured images feint or even blank.

Figure 6A:
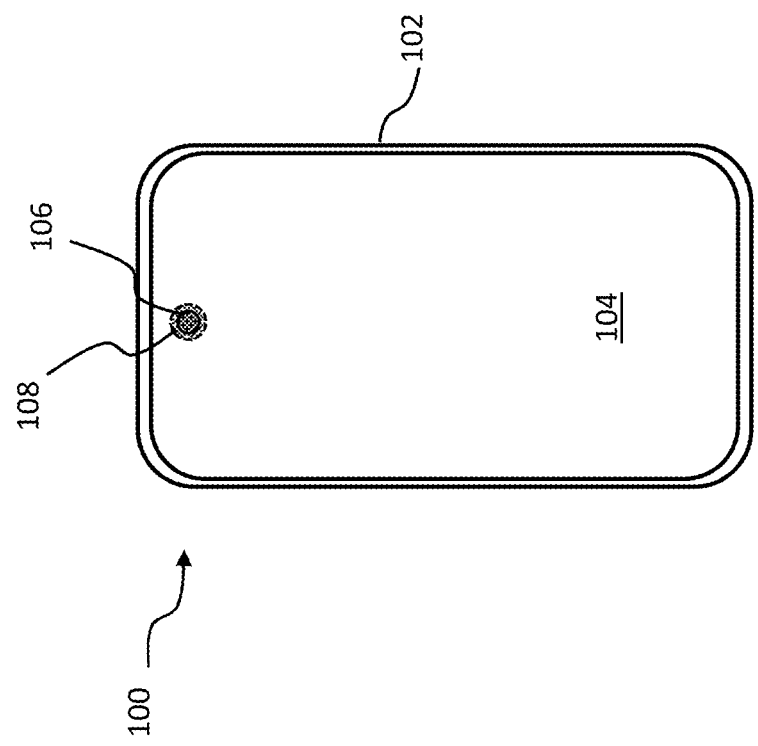
FIG. 6A is a front plan view of the FIG. 1 user device where all display pixels above the under-display camera are enabled, according to one or more example embodiments.
Figure 6B:
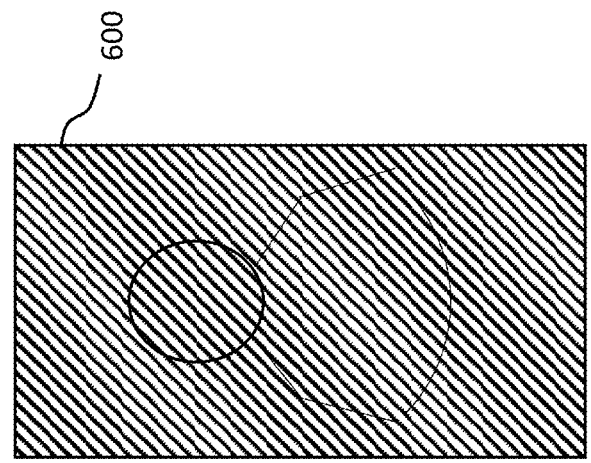
FIG. 6B shows an image captured by the FIG. 6A user device.

Regarding the third operation 403, enabling at least some of the disabled display pixels may comprise modifying substantially all (in terms of area) of the image or images being captured. FIG. 6A shows such a modification in which at least some of the disabled display pixels of the first set of display pixels 108 are enabled with a uniform distribution to modify all of the image, as shown in FIG. 6B as a modified image 600. To give some examples, enabling only red display pixels may cause the image to appear red and blurry, and enabling only infra-red or near-infra-red display pixels may cause deterioration of the contrast of the image. Different colours and combinations may be used. Alternatively, enabling at least some of the disabled display pixels may comprise modifying only a sub-portion (in terms of area) of the disabled display pixels to modify a corresponding sub-portion of the image or images being captured. Similar to above, enabling only red display pixels may result in the modified sub-portion appearing red and blurry, and enabling only infra-red or near-infra-red display pixels may cause deterioration of the contrast of the modified sub-portion. Different colours and combinations may be used.

In all such examples described herein, when display pixels are enabled, a user will understand that modification is being performed because they can see the enabled display pixels over the camera sensor 106, which may become partially or fully hidden.

FIG. 7A shows such a modification in which only some of the disabled display pixels, in a top half, are enabled.

FIG. 7B is a modified image 700 which may result, in which only the top half 702 is modified.

FIG. 7C is an alternative modified image 710 in which only a region 706 comprising facial features is modified. The region 706 may be identified using known facial recognition and segmentation algorithms. The region 706 may extend slightly beyond the bounds of the facial features, e.g. by one or a few millimetres.

In any of the above cases, modification of captured images may continue so long as the one or more predetermined conditions mentioned with regard to the second operation 402 is or are met; when not met, modification may stop or an option may be presented to the user which may require further confirmatory input in order for the modification to stop.

Upon detection of the one or more predetermined conditions mentioned with regard to the second operation 402, an indication may be output in the form of visual, audible and/or haptic output; this signals to the user that modification is taking place and the user may be reassured by the indication or may choose to override the indication if they feel it is not required. If a visual indication, a graphic may be displayed on the display 104. The graphic may be animated to make it more noticeable or informative. For example, if the smartphone is connected or connecting to a remote node for a streaming session, the graphic may comprise a camera shutter animation which opens to indicate when streaming will start or which closes to indicate when streaming will end. Alternatively a count-up or count-down graphic may be used.

Figure 8B:
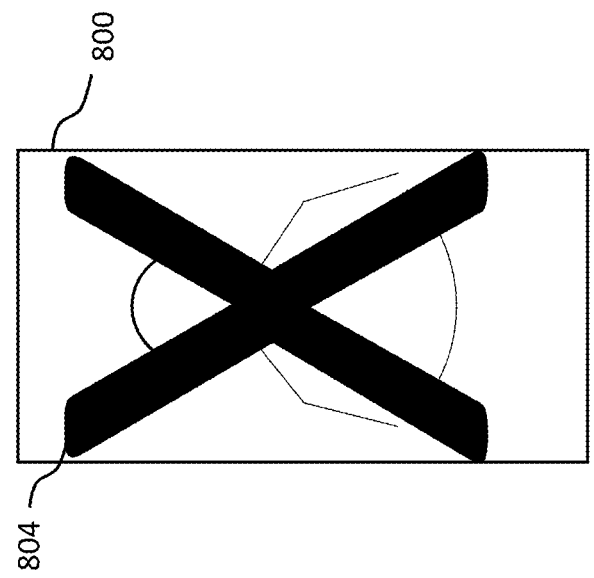
FIG. 8B shows an image captured by the FIG. 8A user device.
Figure 8A:
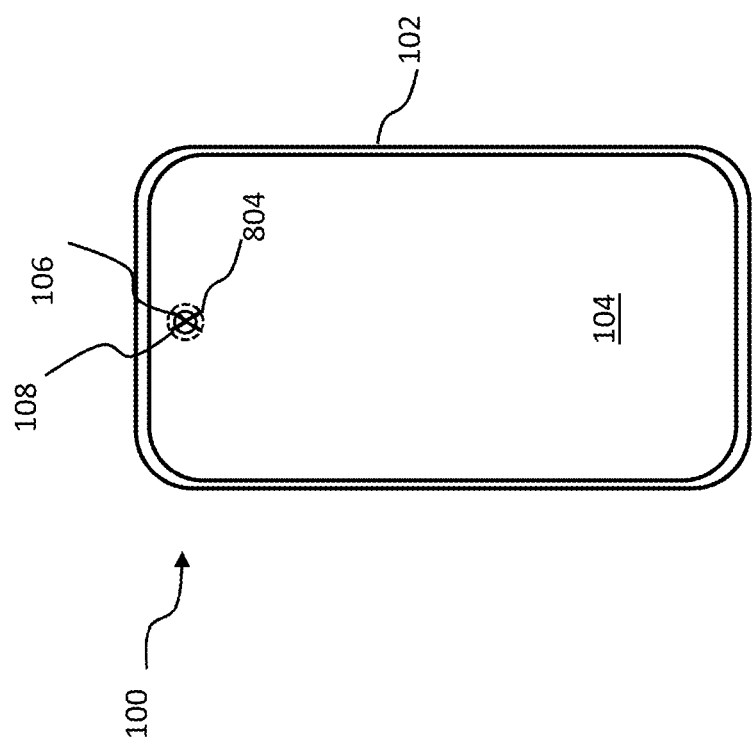
FIG. 8A is a front plan view of the FIG. 1 user device where display pixels above the under-display camera are enabled to show an icon or graphic, according to one or more example embodiments.

In some example embodiments, the indicator may a graphic at least part of which is comprised by enabling one or more of the disabled display pixels of the first set of display pixels 108. As shown in FIG. 8A, for example, a graphic "X" 804 may be displayed by enabling certain ones of the first set of display pixels 108. The graphic 804 serves both as an indicator to the user and, as shown in FIG. 8B, modifies part of the captured image 800 in the shown manner to increase privacy. Alternative graphics may be used. The graphics may be selected from a predetermined set of available graphics, e.g. a gallery. In some example embodiments, the graphics may animate, e.g. to pulse, rotate or grow based on some variable such as rate of speech or loudness. In some example embodiments, it may be possible through suitable algorithms, for example machine-learning (ML) algorithms, to analyse an ongoing conversation and, based on audio-visual cues, to detect a tone or emotive nature of the conversation. The graphic may be indicative of the detected tone, for example to display a red tone graphic if the user is detected as angry or frustrated; this may encourage the user to calm down and inform other users of the emotion. If the user is detected as happy or thankful, the indicator may be a heart-shape or smiling face.

In some example embodiments, the predetermined condition mentioned in relation to the second operation 402 may comprise detecting a specific image modification user input during capture of one or more images. That is, the user may be using the under-display camera 105 in the first mode of operation (with no modification) during a conference call. At some point, they may wish to switch to a privacy mode of operation, which may be effected through the display screen and/or through some other mechanism, e.g. using a gesture or voice command.

Figure 9B:
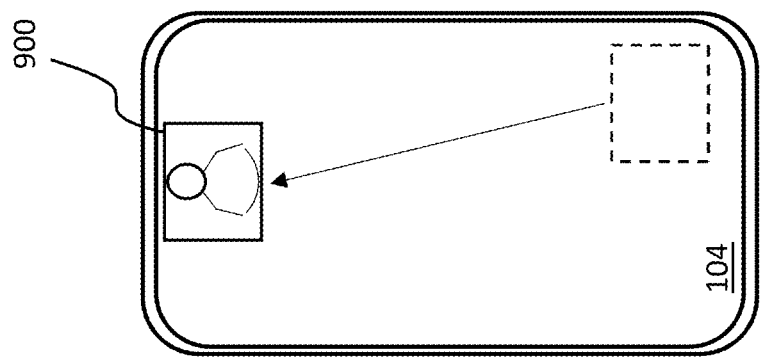
FIG. 9B indicates movement of the viewfinder window to a position of the under-display camera to effect modification, according to one or more example embodiments.
Figure 9A:
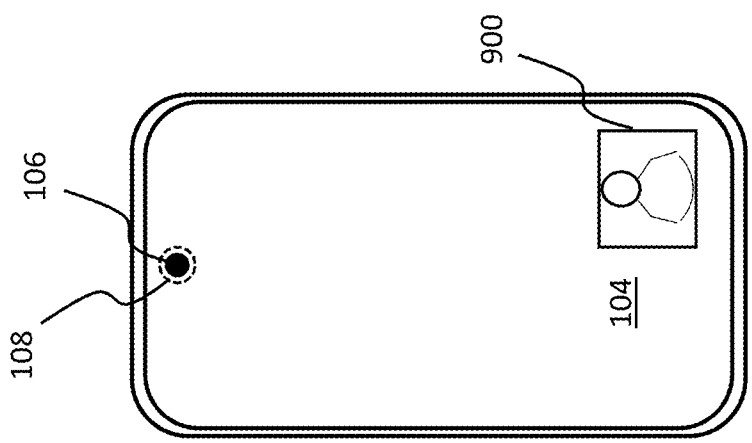
FIG. 9A is a front plan view of the FIG. 1 user device where a viewfinder window is displayed.

One method of performing this may be to locate a displayed graphical element over the position on the display 104 of the under-display camera 105, i.e. the position of the first set of display pixels 108. For example, as shown in FIG. 9A, the user may select and drag a viewfinder window 900 which currently displays the user being captured, to the position of the under-first set of display pixels 108. This may result in the aforementioned image modifications in a simple, quick and intuitive way without the need to enable a global privacy setting.

Example embodiments have been described in terms of a privacy mode application, i.e. for hiding or degrading image details in certain circumstances.

However, in other embodiments, same or similar operations may be used for other reasons, for example to add artistic effects by means of enabling certain disabled display pixels. For example, a user may wish to keep their facial features in full detail but blur their background or to overlay certain emotive graphics.

EXAMPLE APPARATUS

Figure 10:
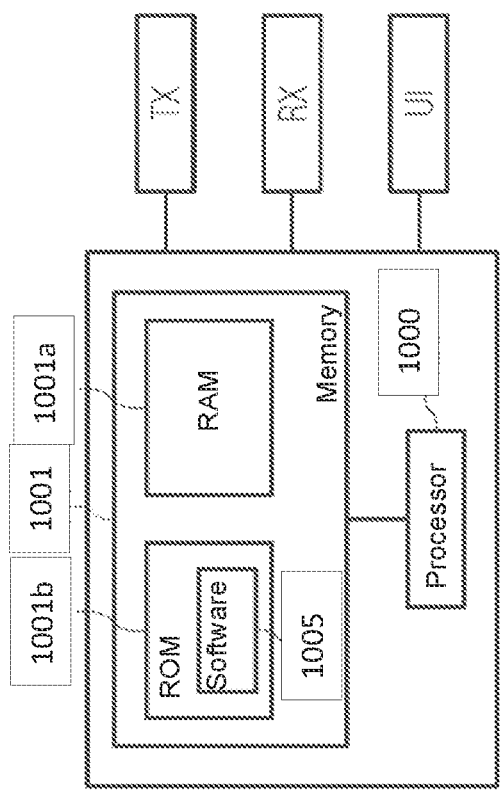
FIG. 10 is a schematic block diagram of an apparatus according to one or more example embodiments.

FIG. 10 shows an apparatus according to some example embodiments. The apparatus may be configured to perform the operations described herein, for example operations described with reference to any disclosed process. The apparatus comprises at least one processor 1000 and at least one memory 1001 directly or closely connected to the processor. The memory 1001 includes at least one random access memory (RAM) 1001a and at least one read-only memory (ROM) 1001b. Computer program code (software) 1005 is stored in the ROM 1001b. The apparatus may be connected to a transmitter (TX) and a receiver (RX). The apparatus may, optionally, be connected with a user interface (UI) for instructing the apparatus and/or for outputting data. The at least one processor 1000, with the at least one memory 1001 and the computer program code 1005 are arranged to cause the apparatus to at least perform at least the method according to any preceding process, for example as disclosed in relation to the flow diagrams of FIG. 4 and related features thereof.

Figure 11:
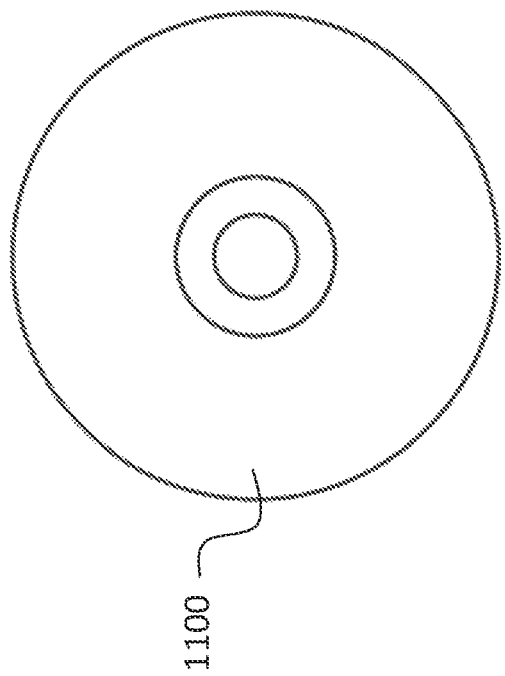
FIG. 11 is a non-transitory medium for storing computer-readable instructions which, when executed or processed by one or more processors of an apparatus, may perform operations according to one or more example embodiments.

FIG. 11 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program instructions, causing an apparatus to perform the method of any preceding process for example as disclosed in relation to the flow diagrams of FIG. 4 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
   at least one processor; and
   at least one memory storing instructions that, when executed by the at least one processor, cause the apparatus at least to:
   capture images using an under-display camera in which at least some display pixels which overlie a camera sensor are disabled, the under-display camera being located under a display of the apparatus;
   detect at least one predetermined condition; and
   enable at least some of the disabled display pixels to modify at least part of an image or images being captured, responsive to detecting the at least one predetermined condition,
   wherein at least some of the disabled display pixels comprise infra-red or near-infra-red display pixels and wherein the apparatus is further caused to reduce the contrast of at least part of the image or images being captured by enabling the infra-red or near-infra-red display pixels.

2. The apparatus of claim 1, wherein the apparatus is further caused to enable substantially all of the disabled display pixels to modify substantially all of the image or images being captured.

3. The apparatus of claim 1, wherein the apparatus is further caused to enable only a sub-portion of the disabled display pixels to modify only a sub-portion of the image or images being captured.

4. The apparatus of claim 1, wherein the apparatus is further caused to enable at least some of the disabled display pixels so as to perform one or more of:
   blurring at least part of the image or images being captured; or
   blending at least part of the image or images being captured with another image.

5. The apparatus of claim 1, wherein the apparatus is further caused to display an icon or graphic on the display of the apparatus indicative of detection of the at least one predetermined condition, wherein optionally the apparatus is further caused to display the icon or graphic by enabling at least some of the disabled display pixels to simultaneously display the icon or graphic on the display and modify at least part of the image or images being captured.

6. The apparatus of claim 1, wherein the at least one predetermined condition comprises detection of a user privacy preference associated with the apparatus or a user of the apparatus.

7. The apparatus of claim 1, wherein the at least one predetermined condition comprises detection of facial features in the image or images being captured,
   wherein optionally the detected facial features are determined to match reference facial features associated with a particular person.

8. The apparatus of claim 7, wherein the at least one predetermined condition comprises detection of a user privacy preference associated with the apparatus or a user of the apparatus; and
   wherein the user privacy preference is associated with the particular person, and is indicative that images comprising facial features associated with the particular person are to be modified.

9. The apparatus of claim 7, wherein the apparatus is further caused to enable a sub-portion of the disabled display pixels to modify at least a sub-portion of the image or images being captured which correspond to the detected facial features.

10. The apparatus of claim 1, wherein the apparatus is further caused to determine a location of the apparatus, and wherein the at least one predetermined condition comprises identifying that said location corresponds to a predetermined location in which an image or images being captured are to be modified.

11. The apparatus of claim 1, wherein the at least one predetermined condition comprises detecting an image modification user-input during capture of the image or images.

12. The apparatus of claim 11, wherein the image modification user-input comprises user selection of a graphical element shown on the display of the apparatus, wherein optionally the graphical element comprises a viewfinder window showing what is being captured by the under-display camera and wherein the image modification user-input comprises user placement of the viewfinder window to a position corresponding to the under-display camera.

13. The apparatus of claim 1, wherein the under-display camera is on a front side of the apparatus, the apparatus further comprising a further camera on a rear side thereof and means for disabling the further camera upon detection of the at least one predetermined condition.

14. A method, comprising:
   capturing images using an under-display camera of an apparatus in which at least some display pixels which overlie a camera sensor are disabled;
   detecting at least one predetermined condition; and
   enabling at least some of the disabled display pixels to modify at least part of an image or images being captured, responsive to detecting the at least one predetermined condition,
   wherein at least some of the disabled display pixels comprise infra-red or near-infra-red display pixels and wherein the apparatus is further caused to reduce the contrast of at least part of the image or images being captured by enabling the infra-red or near-infra-red display pixels.

15. The method of claim 14, further comprising enabling substantially all of the disabled display pixels to modify substantially all of the image or images being captured.

16. The method of claim 14, further comprising enabling only a sub-portion of the disabled display pixels to modify only a sub-portion of the image or images being captured.

17. The method of claim 14, further comprising enabling at least some of the disabled display pixels so as to perform one or more of:
- blurring at least part of the image or images being captured; or
- blending at least part of the image or images being captured with another image.

18. The method of claim 14, further comprising displaying an icon or graphic on the display of the apparatus indicative of detection of the at least one predetermined condition, wherein optionally the method further comprising displaying the icon or graphic by enabling at least some of the disabled display pixels to simultaneously display the icon or graphic on the display and modify at least part of the image or images being captured.

19. A non-transitory computer readable medium comprising program instructions when executed by an apparatus, cause the apparatus to perform at least the following:
- capturing images using an under-display camera of an apparatus in which at least some display pixels which overlie a camera sensor are disabled;
- detecting at least one predetermined condition; and
- enabling at least some of the disabled display pixels to modify at least part of an image or images being captured, responsive to detecting the at least one predetermined condition,
- wherein at least some of the disabled display pixels comprise infra-red or near-infra-red display pixels and wherein the apparatus is further caused to reduce the contrast of at least part of the image or images being captured by enabling the infra-red or near-infra-red display pixels.

* * * * *